United States Patent [19]

Miller

[11] Patent Number: 5,610,789
[45] Date of Patent: Mar. 11, 1997

[54] TAPE CARTRIDGE WITH A GATE MEMBER SLIDABLY MOUNTED AN ACCESS DOOR

[75] Inventor: Stephen H. Miller, Rochester, N.Y.

[73] Assignee: Eastman Kodak Company, Rochester, N.Y.

[21] Appl. No.: 438,227

[22] Filed: May 9, 1995

[51] Int. Cl.⁶ .................................................. G11B 23/02
[52] U.S. Cl. .......................................................... 360/132
[58] Field of Search ............................ 360/132; 242/326, 242/335; 354/275; 369/291

[56] References Cited

U.S. PATENT DOCUMENTS

| | | | |
|---|---|---|---|
| 4,580,184 | 4/1986 | Abe | 360/132 |
| 4,589,609 | 5/1986 | Oishi et al. | 360/132 |
| 4,628,713 | 12/1986 | Cecchi et al. | 360/132 |
| 4,750,074 | 6/1988 | Oishi | 360/132 |
| 4,807,213 | 2/1989 | Chung et al. | 369/46 |
| 5,215,808 | 6/1993 | Barnard | 428/194 |

Primary Examiner—Stuart S. Levy
Assistant Examiner—David D. Davis
Attorney, Agent, or Firm—Raymond L. Owens

[57] ABSTRACT

A tape cartridge, e.g. for containing a spirally wound optical recording tape, is provided with safety details to prevent access to the tape by a cartridge user or by an unintended tape drive, e.g., a magnetic tape drive. According to a preferred embodiment, a movable door-locking member on the cartridge's tape access door is normally covered by a movably mounted gate member which blocks physical contact by a user, or by a door-unlocking mechanism of the tape drive. When the cartridge is loaded into an appropriate tape drive, gate-moving structure associated with such tape drive operates to move the gate member to an unblocking position in which the door-locking member is accessible to the unlocking mechanism of the tape drive. The invention enables a single tape cartridge to be used in different types of tape drives, such as optical or magnetic tape drives, with only minor modification to the cartridge's access door.

18 Claims, 4 Drawing Sheets

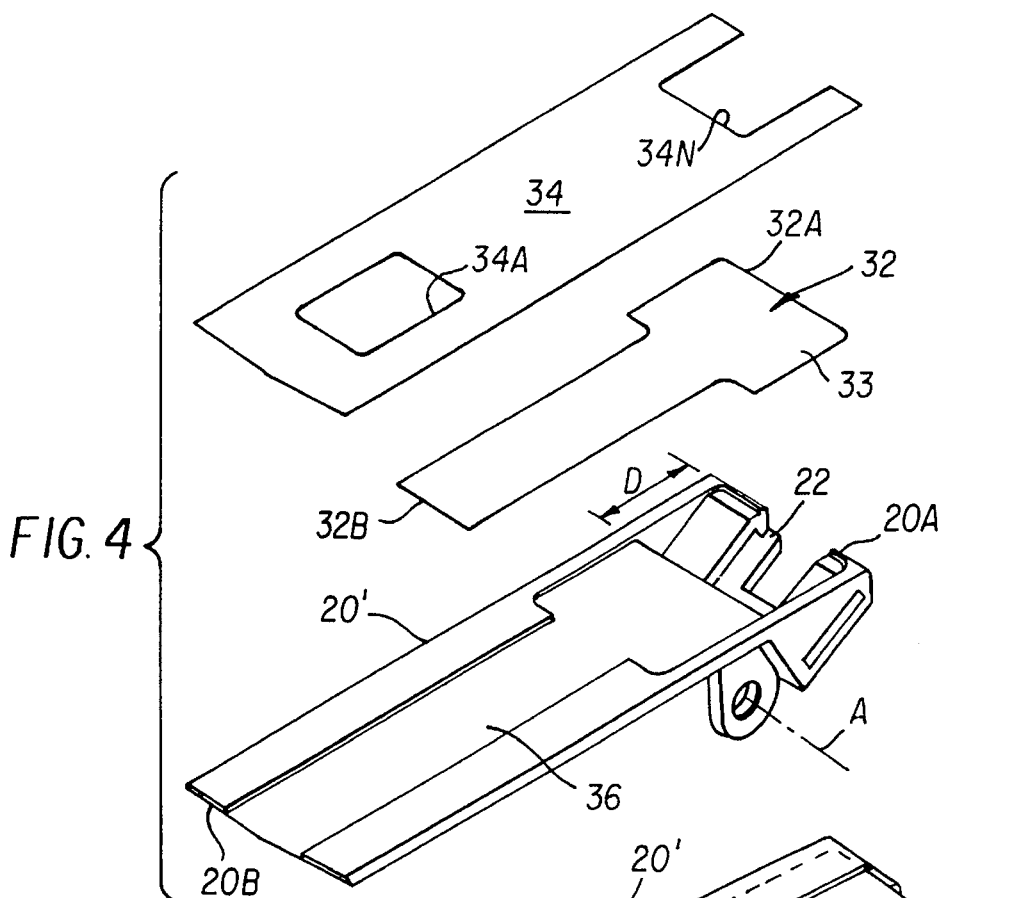
FIG. 4
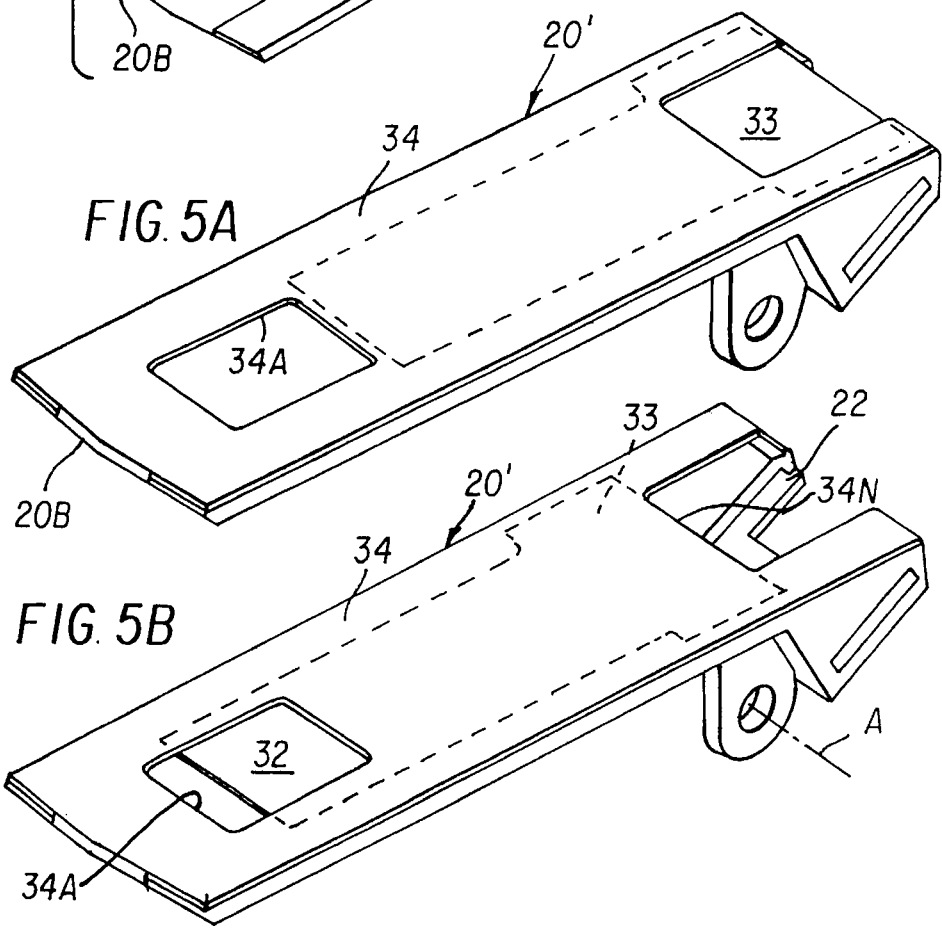
FIG. 5A
FIG. 5B

TAPE CARTRIDGE WITH A GATE MEMBER SLIDABLY MOUNTED AN ACCESS DOOR

FIELD OF THE INVENTION

The present invention relates to the field of tape recording. More particularly, it relates to improvements in tape cartridges of the type which incorporate a mechanism for preventing a cartridge of a particular kind, e.g., an optical tape cartridge, from being mistakenly used in a tape drive for which it was not intended, e.g., a magnetic tape drive.

BACKGROUND OF THE INVENTION

For decades, magnetic recording has been effected on magnetic tape. While a wide assortment of cartridges has been designed to house such tapes and protect them from damage, they all conform to certain established Technical Standards that assure that all cartridges in a particular class can be used in tape drives designed to receive such classes of cartridges. A popular magnetic tape cartridge which is often used for recording computer-generated data is the DLT-2000 Magnetic Tape Cartridge manufactured by Digital Equipment Corporation. This cartridge, shown in FIGS. 1 and 2, is designed to meet Standard ECMA-197, a technical standard set by the European Computer Manufacturers Association (ECMA) in December 1993. The title of this standard is "Data Interchange on 12.7 mm 112-Track Magnetic Tape Cartridges—DLT 2 Format."

Referring to FIGS. 1 and 2, the DLT-2000 cartridge comprises a box-like container 10 which is adapted to receive a spirally wound strip of magnetic recording tape. The cartridge includes square top and bottom walls, 12 and 14, respectively, each supporting flanges 16 which abut each other to define four side walls 18A–18D. The front side wall 18A enters the tape drive first and is provided with a pivotally mounted access door 20 through which the tape drive gains access to the magnetic tape within. The access door is mounted on the cartridge for pivotal movement about axis A. When the cartridge is not in use, the access door is in a cartridge-closing position, as shown in solid lines in FIG. 2. When the cartridge is being used, the access door is pivoted about axis A to an open position, as shown in phantom lines in FIG. 2. When the access door is opened, a tape drive mechanism can enter the cartridge and withdraw the free end of the tape within. To prevent the access door from swinging open when the cartridge is not in use, the door is spring biased towards its closed position, and a door locking member 22 is provided. Door-locking member 22 is slidably mounted on the door to move in a direction parallel to pivot axis A, and a coil spring S serves to urge the locking member in a downward direction, as viewed in FIG. 1, towards its door-locking position. In its door-locking position, a free end (not shown) of the locking member engages a slot (not shown) formed in the cartridge's bottom wall and thereby prevents relative movement between the door and the cartridge. In loading the cartridge into a conventional magnetic tape drive, a door-unlocking structure associated with the drive acts to apply an unlocking force on the locking member, causing it to move in an upward direction, against the force of spring S. Simultaneous with the application of the door-unlocking force, another force is applied to an edge 20A of the access door, causing it to pivot about axis A to its open position. Upon opening the access door in the manner described, a tape drive mechanism enters the cartridge, engages the free end of the tape, and extracts the tape from the cartridge for use. In use, the tape is commonly wrapped in a helical fashion about a drum where it is scanned by a pair of magnetic write/read heads.

Recently, with the advent of optical disk recording and the tremendous increase in data storage capacity it represents, considerable effort has been applied to the challenge of optically recording data on tape. A relatively early disclosure of an optical tape recording system is provided in U.S. Pat. No. 4,807,213, issued Feb. 21, 1989 to S. T. Chung et al. According to this disclosure, an optical tape recording medium is wrapped in a helical fashion about a "laser drum" containing a pair of semiconductor lasers. The laser drum operates to helically scan slanted data tracks the tape, in a manner similar to the scanning technique used in conventional magnetic video tape recorders, to optically record and/or reproduce data on the tape.

Optical recording tapes of the type considered to date typically comprise a relatively thin and flexible laminate composed of a base layer of polyethylene terephthalate (PET) or the like, and a plurality of other layers superimposed thereon, including subbing, reflective, optical recording and encapsulation layers, in that order. Optionally, a gas-trapping transparent membrane may be added to the top of the encapsulation layer to displace dust and dirt particles from the focal plane of the recording layer. See, e.g., the disclosure of the commonly assigned U.S. Pat. No. 5,215,808, issued in the name of J. A. Barnard. The overall thickness of the laminate is about 25 microns, and data is recorded on the tape by forming micron sized marks in the recording layer. Since any foreign material (e.g., dust or dirt particles) and scratches on the tape surface can occlude significant portions of the recording layer and thereby prevent data from being either recorded thereon or reproduced therefrom, special care must be taken in the optical tape drive to avoid such artifacts. This special care requirement usually translates to a tape handling path within the optical tape drive which significantly differs from that used in conventional magnetic tape drives. Whereas a magnetic tape drive can, owing to the robust nature of the magnetic recording medium and recording process, treat the magnetic tape in a relatively physical manner, using capstan drives and pinch rollers to push and pull the tape through the drive, an optical tape drive must interact with its recording medium far less aggressively. Thus, were an optical tape housed in a Standard ECMA-197 cartridge, such as that described above, mistakenly loaded into a magnetic tape drive, it is highly probable that the optical tape would be seriously damaged by the magnetic tape drive. Further, were an optical tape housed in such a cartridge, the tape could be easily damaged by air-borne dirt and dust particles inasmuch as the aforementioned forces required to open the cartridge's access door can be readily applied by hand by the cartridge user, even inadvertently.

SUMMARY OF THE INVENTION

In view of the foregoing discussion, an object of this invention is to provide a tape cartridge of the type described with a safety feature that prevents the cartridge from being loaded into a tape drive for which it is not intended.

Another object of this invention is to provide a tape cartridge of the type described which is less susceptible to being inadvertently opened by a user.

This object is achieved by a tape cartridge adapted to contain a strip of data recording media for use in a predetermined tape drive adapted to record and/or playback data on such strip, said cartridge comprising:

(a) wall means defining an enclosure for said strip, said enclosure having an opening through which said strip is accessible from the exterior of said enclosure;

(b) an access door movably mounted on said wall means for movement between a closed position in which said access door overlies said opening and thereby denies access to a strip within said enclosure, and an open position in which said access door is spaced from said opening and thereby enables access to a strip within said cartridge;

(c) door-locking means for selectively locking said door in its closed position, said door-locking means being engagable by door-unlocking structure associated with said predetermined tape drive to enable said door to move towards its open position during loading of said cartridge into said tape drive; and (d) safety means for normally preventing contact between said door-locking means and said door-unlocking structure during loading of said cartridge into said tape drive, said safety means comprising a gate member movably mounted on said cartridge from a first position in which said gate member overlies said door-locking member and blocks contact between said door-locking member and said door-unlocking structure, and a second position in which said gate member is sufficiently displaced from said door-locking member to enable contact between said door-locking member and said door-unlocking structure.

Unlike the magnetic tape cartridge of the prior art, however, the tape cartridge of the invention is characterized by safety feature that not only presents a physical impairment to loading the cartridge into a conventional magnetic tape drive, but also reduces the likelihood that the cartridge user will contact the door-locking member of the access door and thereby inadvertently, or otherwise, open the access door. Such safety feature comprises a gate member which is movably mounted on the cartridge's access door from a first position in which the gate member overlies the door-locking member of the access door and thereby blocks contact between such door-locking member and the door-unlocking structure of any tape drive in which the cartridge is insertable, and a second position in which the gate member is sufficiently displaced from the door-locking member of the access door to enable contact between such door-locking member and the door-unlocking structure of the tape drive. The gate member is adapted to be moved from its first position to its second position by structure found only in a tape drive for which the cartridge is intended (e.g. an optical tape drive). When the gate member is in its blocking first position, it presents a physical impairment to loading the cartridge into a standard magnetic tape drive. Thus, in the event the cartridge of the invention contains optical tape and one attempts to load the cartridge into a magnetic tape drive, it will not be accepted by the drive. The invention is advantageous in that it enables a single type of tape cartridge to be used in different kinds of tape drives, such as optical or magnetic tape drives, with only minor modification to the cartridge's access door.

The invention and its various advantages will be better understood from the ensuing detailed description of preferred embodiments, reference being made to the accompanying drawings wherein like reference characters denote like parts.

BRIEF DESCRIPTION OF THE DRAWINGS

FIG. 4 is an exploded perspective view of the access door of the FIG. 3 cartridge;

FIGS. 5A and 5B are enlarged perspective views of the access door of the FIG. 3 cartridge showing the safety slide gate in two different positions;

DETAILED DESCRIPTION OF THE INVENTION

Figure 1:
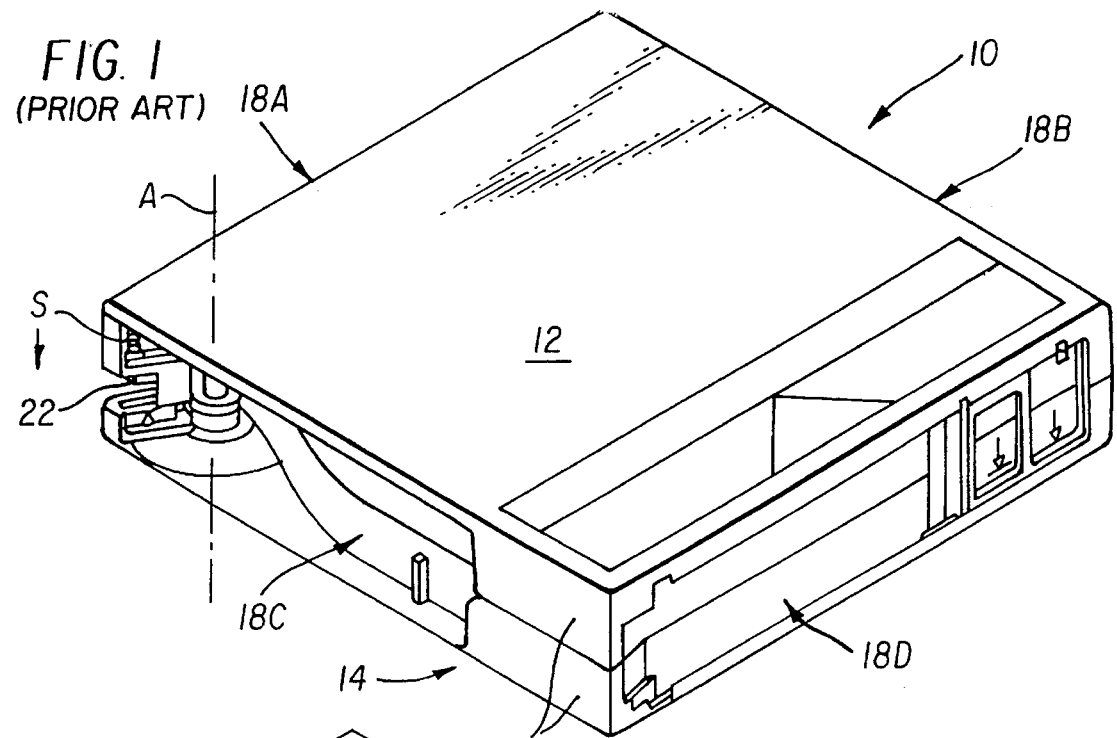
FIGS. 1 and 2 are perspective views of a conventional magnetic tape cartridge.
Figure 2:
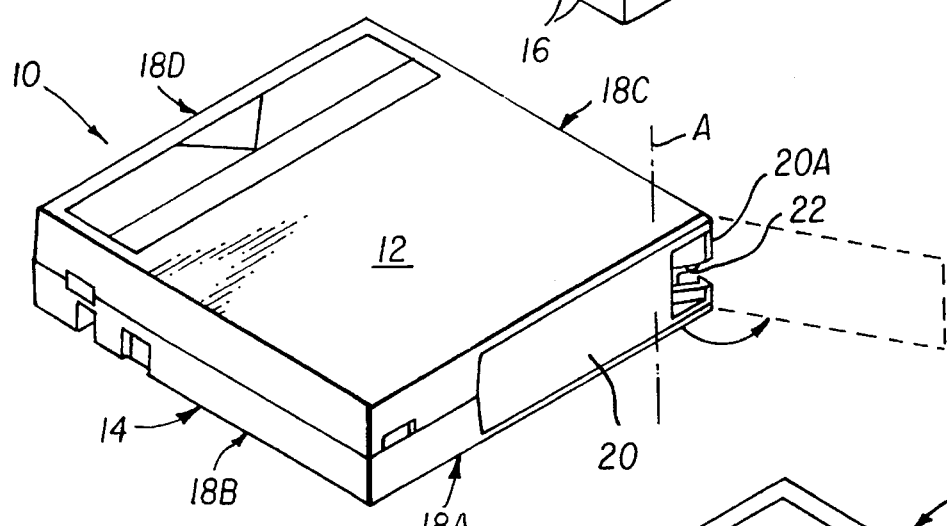
Figure 3:
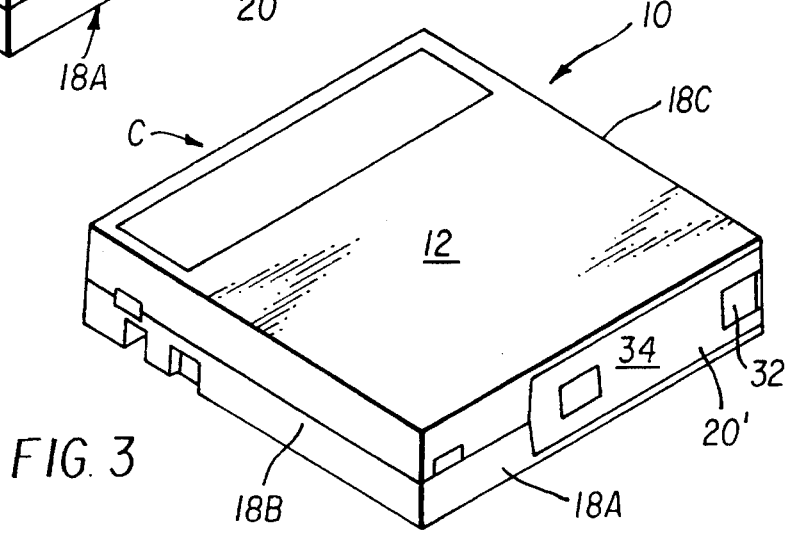
FIG. 3 is a perspective view of a tape cartridge embodying the present invention.

Referring now to FIG. 3, the tape cartridge C of the invention is shown as being a modified version of the magnetic cartridge illustrated and described above with reference to FIGS. 1 and 2. It is assumed that cartridge C will be used to house a data recording tape other than a magnetic tape, e.g., an optical or magnetooptical tape, and, hence, the cartridge should not be accepted by a magnetic tape drive. It is also assumed that the performance of the recording tape of cartridge C is more dependent on a clean environment than is the case with magnetic tape and, hence, the cartridge access door should be more tamper-proof than conventional magnetic cartridges.

In accordance with the invention, the access door 20' of cartridge C is provided with a safety feature which, as noted above, not only physically impairs loading the cartridge into a standard magnetic tape drive, but also makes it more difficult for a user to open the cartridge's access door by hand. According to a preferred embodiment, such safety feature comprises a T-shaped slide gate 32 and a retaining cover plate 34, both being mounted on and supported by the cartridge access door.

Referring to FIGS. 4, 5A and 5B, access door 20' is provided with a T-shaped recess 36 which is adapted to receive the T-shaped slide gate. Recess 36 is dimensioned to allow the slide gate to slide through a distance D within the recess, from a first position (shown in FIG. 5A) in which the top portion 33 of the slide gate overlies and blocks access to the door-locking member 22 of the access door, and a second position (shown in FIG. 5B) in which the top portion is displaced from the locking member and allows it to be engaged and operated by the tape drive's unlocking structure.

Slide gate 32 is retained in the access door's recess 36 by cover plate 34. The latter is connected to the access door by adhesive strips (or other fastener means) disposed along the outer edges of the cover plate. The cover plate is provided with a notched portion 34N which enables a force to be applied to the top edge 32A of the slide gate in order to slide the slide gate from its first position to its second position. As explained below, the slide gate may be spring biased towards its blocking position shown in FIG. 5A. More preferred, however, is that the slide gate be mechanically returned to its blocking position by an L-shaped leaf spring positioned in the tape drive. As explained below, an end of such leaf spring engages the bottom edge 32B of the slide gate through an aperture 34A formed in the cover plate and acts to push the slide gate back to its blocking position.

Figure 6:
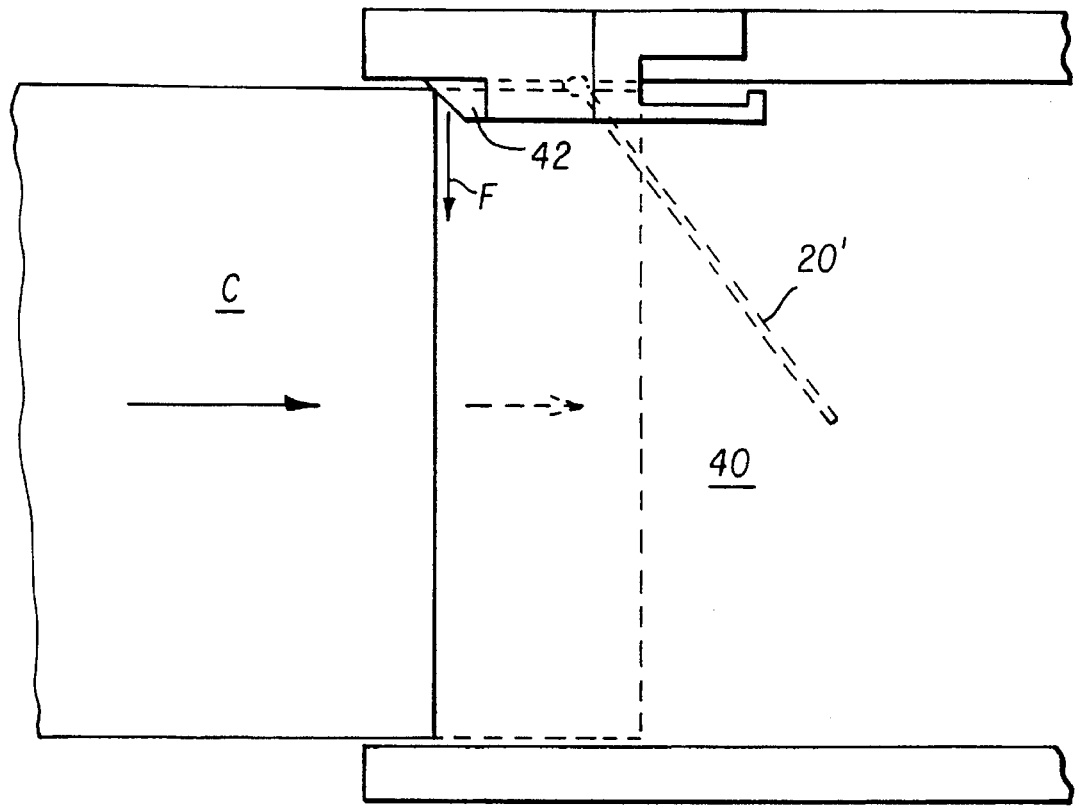
FIG. 6 is a top plan illustration of a cartridge entering a tape drive adapted to receive such cartridge.

Referring to FIG. 6, as cartridge C enters the tape drive 40, a chamfered surface 42 associated with the tape drive engages the top edge 32A of the slide gate and exerts a force F in the direction of the arrow, i.e., perpendicular to the direction of cartridge movement. Such force acts to slide the slide gate from its blocking first position to its unblocking second position, allowing other tape drive structure to engage the door-locking member and move it to an unlocking position, and to swing the access door to the open position. Note, top edge 32A of the slide gate presents a physical impairment to loading the cartridge in a standard magnetic drive in that such drives have no such chamfered surfaces to urge the slide gate to a position in which the door-locking mechanism can be operated. Thus, were one to attempt to load cartridge C into a standard magnetic tape drive, the edge of the slide gate will abut the door opening structure of the tape drive and prevent further forward movement of the cartridge.

Figure 7:
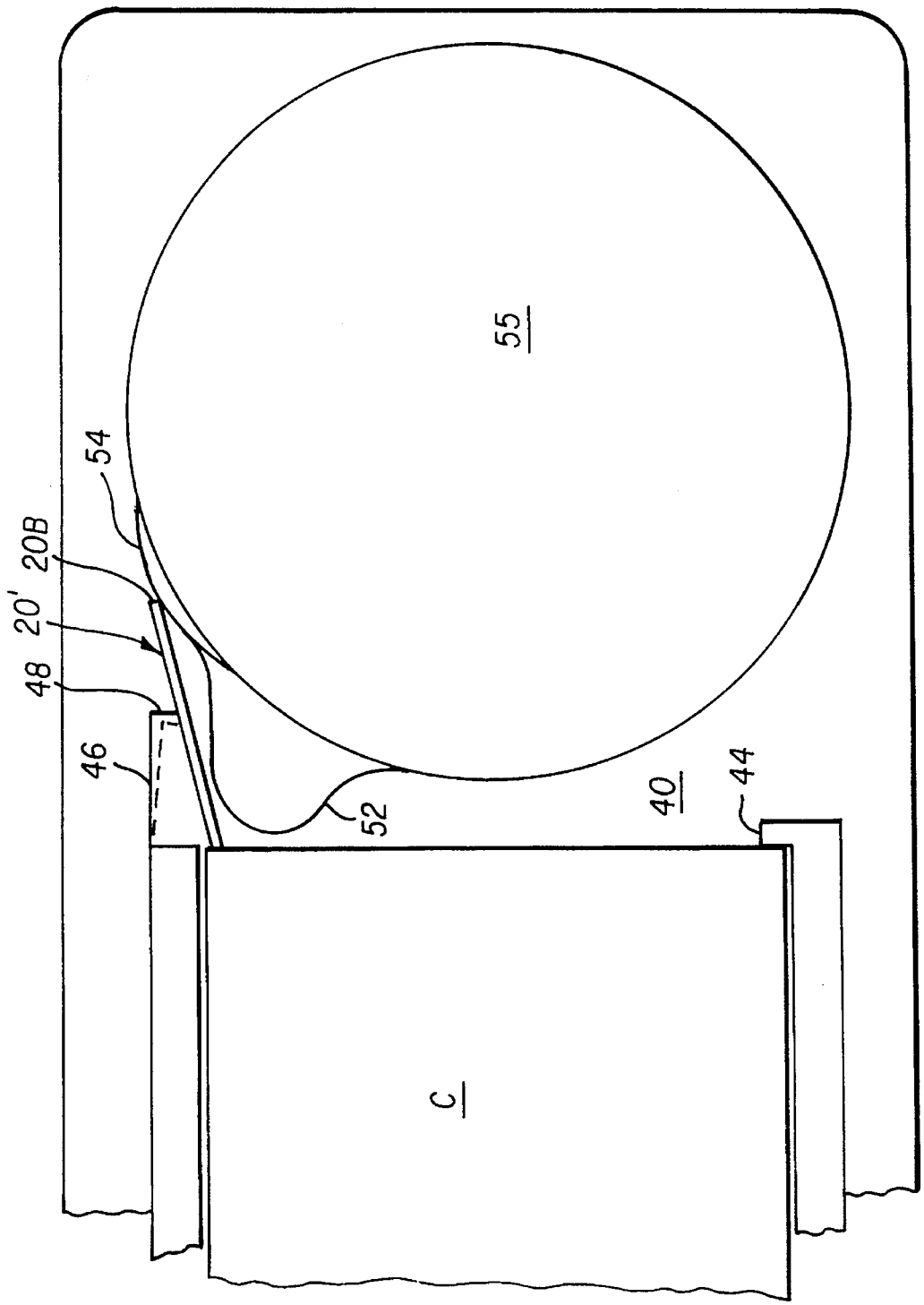
FIG. 7 is a top plan illustration of a cartridge fully inserted into a tape drive.

Referring to FIG. 7, as the cartridge moves towards its limit determined by stop 44 in the tape drive, an end 48 of an L-shaped leaf spring 46 enters aperture 34A of the cover plate, engages the bottom edge 32B of the slide gate and returns the slide gate to its blocking first position. Precise control over the position of the access door is provided by first and second camming surfaces 52 and 54 carried by a shroud 55 covering the tape threading mechanism (not shown) of the tape drive. Cam surface 52 is engaged by the leading edge 20B of the access door, steering the door from the cartridge opening during loading. The second cam surface 54 assures that the leaf spring end 48 enters and engages the slide gate end.

Figure 8A:
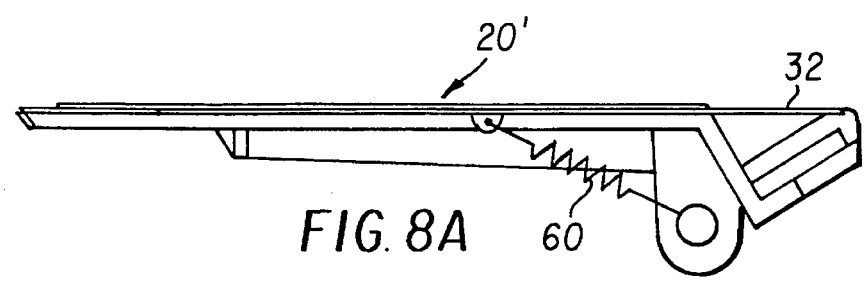
FIGS. 8A and 8B illustrate an alternative embodiments for biasing the slide gate member of the cartridge access door.
Figure 8B:
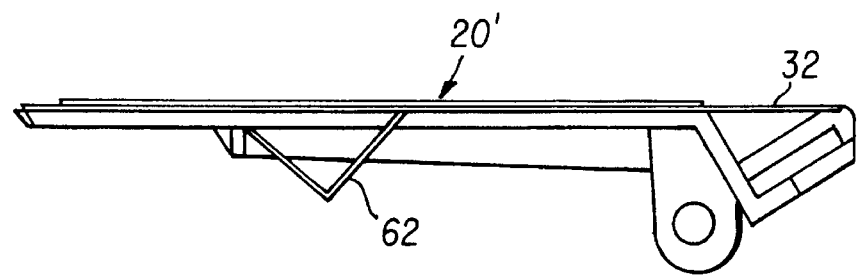

In FIGS. 8A and 8B, two different schemes are illustrated for automatically returning the slide gate to its blocking first position after being slided away therefrom by the chamfered surface 42. In FIG. 8A, a coil spring 60, is connected between the slide gate and the access door to bias the gate towards its blocking first position. In FIG. 8B. a leaf spring 62, integral with the slide gate, serves the same purpose.

While the invention has been described with particular reference to preferred embodiments, it will be appreciated that variations and modifications can be effected by a person of ordinary skill in the art without departing from the scope of the invention.

PARTS LIST 10 box-like container
12 top wall
14 bottom wall
16 flanges
18A side wall
18B side wall
18C side wall
18D side wall
20 access door
20' access door of new cartridge
20A door edge
20B door edge
22 door-locking member
C cartridge
32 slide gate
32A top edge of slide gate
32B bottom edge of slide gate
33 top portion of slide gate
34 cover plate
34A aperture in cover plate
34N notch in cover plate
36 recess in access door
A pivot axis
40 tape drive
42 chamfered surface
44 stop
46 leaf spring
48 end of leaf spring
52 cam surface
54 cam surface
55 shroud
60 coil spring
62 leaf spring
F force
S spring

I claim:

1. A tape cartridge adapted to contain a strip of data recording media for use in a predetermined tape drive adapted to record and/or playback data on such strip, said cartridge comprising:

(a) wall means defining an enclosure for said strip, said enclosure having an opening through which said strip is accessible from the exterior of said enclosure;

(b) an access door movably mounted on said wall means for movement between a closed position in which said access door overlies said opening and thereby denies access to said strip within said enclosure, and an open position in which said access door is spaced from said opening and thereby enables access to a strip within said cartridge;

(c) door-locking means for selectively locking said door in its closed position, said door-locking means being engagable by door-unlocking structure associated with said predetermined tape drive to enable said door to move towards its open position during loading of said cartridge into said tape drive; and (d) safety means for normally preventing contact between said door-locking means and said door-unlocking structure during loading of said cartridge into said tape drive, said safety means comprising a gate member slidably mounted on said access door and movably mounted on said cartridge from a first position in which said gate member overlies said door-locking means and blocks contact between said door-locking means and said door-unlocking structure, and a second position in which said gate member is sufficiently displaced from said door-locking member to enable contact between said door-locking member and said door-unlocking structure.

2. The apparatus as defined by claim 1 wherein means are provided for urging said gate member towards its first position.

3. The apparatus as defined by claim 2 wherein said urging means comprises a leaf spring.

4. The apparatus as defined by claim 2 wherein said urging means comprises a coil spring.

5. The apparatus as defined by claim 1 wherein said gate member has a T-shaped configuration.

6. The apparatus as defined by claim 5 wherein said door has a recess formed in a surface thereof for receiving said gate member.

7. The apparatus as defined by claim 6 wherein said gate member is retained in said recess by a cover plate rigidly connected to said door.

8. The apparatus as defined by claim 7 wherein said cover plate defines a pair of openings for accessing said gate member to apply a sliding force thereto.

9. The apparatus as defined by claim 1 wherein said gate member, when located in its blocking first position, presents a physical impairment to loading the cartridge in a tape drive for which it is not intended.

10. An optical tape cartridge adapted to contain a spirally wound strip of optical recording media for use in an optical tape drive, said cartridge comprising:

(a) wall means defining an enclosure for said strip, said enclosure having an opening through which said strip is accessible from the exterior of said enclosure;

(b) an access door movably mounted on said wall means for movement between a closed position in which said access door overlies said opening and thereby denies access to a strip within said enclosure, and an open position in which said access door is spaced from said opening and thereby enables access to a strip within said cartridge;

(c) a door-locking member movably mounted on said access door, said door-locking member being movable, by contact with a door-unlocking structure associated with an optical tape drive, from a locking position in which said member cooperates with a portion of said wall means to lock said door in its closed position, and an unlocking position spaced from said portion which enables movement of said door to its open position;

(d) biasing means for biasing said door-locking member towards its locking position; and (e) safety means for normally preventing contact between said door-locking member and said door-unlocking structure associated with the optical tape drive, said safety means comprising a gate member slidably mounted on said access door and movably mounted on said cartridge from a first position in which gate member overlies said door-locking member and blocks contact between said door-locking member and said door-unlocking structure, and a second position in which said gate member is sufficiently displaced from said door-locking member to enable contact between said door-locking member and said door-unlocking structure.

11. The apparatus as defined by claim 10 wherein means are provided for urging said gate member towards its first position.

12. The apparatus as defined by claim 11 wherein said urging means comprises a leaf spring.

13. The apparatus as defined by claim 11 wherein said urging means comprises a coil spring.

14. The apparatus as defined by claim 11 wherein said gate member has a T-shaped configuration.

15. The apparatus as defined by claim 14 wherein said door has a recess formed in a surface thereof for receiving said gate member.

16. The apparatus as defined by claim 15 wherein said gate member is retained in said recess by a cover plate rigidly connected to said door.

17. The apparatus as defined by claim 16 wherein said cover plate defines a pair of openings for accessing said gate member to apply a sliding force thereto.

18. The apparatus as defined by claim 10 wherein said gate member, when located in its blocking first position, presents a physical impairment to loading the cartridge in a tape drive for which it is not intended.

* * * * *